United States Patent
Lee et al.

(10) Patent No.: US 11,070,261 B2
(45) Date of Patent: Jul. 20, 2021

(54) METHOD AND APPARATUS FOR BEAMFORMING IN MOBILE COMMUNICATION SYSTEM

(71) Applicant: SAMSUNG ELECTRONICS CO., LTD., Suwon-si (KR)

(72) Inventors: Myoungwon Lee, Suwon-si (KR); Myonghee Park, Suwon-si (KR); Keonwook Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 16/096,189

(22) PCT Filed: Apr. 26, 2017

(86) PCT No.: PCT/KR2017/004433
§ 371 (c)(1),
(2) Date: Oct. 24, 2018

(87) PCT Pub. No.: WO2017/188724
PCT Pub. Date: Nov. 2, 2017

(65) Prior Publication Data
US 2019/0140720 A1 May 9, 2019

(30) Foreign Application Priority Data
Apr. 26, 2016 (KR) .................. 10-2016-0050707

(51) Int. Cl.
*H04B 7/06* (2006.01)
*H04L 25/02* (2006.01)
(Continued)

(52) U.S. Cl.
CPC ......... *H04B 7/0617* (2013.01); *H04B 7/0417* (2013.01); *H04B 7/0478* (2013.01);
(Continued)

(58) Field of Classification Search
CPC .. H04B 7/0617; H04B 7/0639; H04B 7/0413; H04B 7/0452; H04B 7/0456;
(Continued)

(56) References Cited

U.S. PATENT DOCUMENTS

2010/0150267 A1* 6/2010 Zangi ................ H04L 25/03343
375/296
2012/0281783 A1* 11/2012 Cheng .................. H04B 7/0469
375/295
(Continued)

FOREIGN PATENT DOCUMENTS

| KR | 10-2015-0140368 A | 12/2015 |
|---|---|---|
| WO | 2015093866 A1 | 6/2015 |
| WO | 2015115776 A1 | 8/2015 |

OTHER PUBLICATIONS

Written Opinion (PCT/ISA/237) dated Jul. 24, 2017 by the International Searching Authority in corresponding International Application No. PCT/KR2017/004433.
(Continued)

*Primary Examiner* — Elton Williams
(74) *Attorney, Agent, or Firm* — Sughrue Mion, PLLC

(57) ABSTRACT

The present invention relates to a method and a device for beamforming, and, more particularly, to a method and a device for transmitting a downlink signal by using a two-dimensional active array antenna in a wireless communication system. In order to achieve the objective mentioned above, a beamforming method by a base station in a mobile communication system, according to one embodiment of the present invention, comprises the steps of: receiving an uplink signal from at least one terminal; determining directivity information of a vertical channel of a downlink for the at least one terminal on the basis of the uplink signal; and performing resource scheduling and beamforming for the at least one terminal on the basis of the directivity information
(Continued)

of the vertical channel of the downlink and channel status information in a horizontal direction received from the at least one terminal. According to an embodiment of the present invention, since a base station can estimate vertical channel information by using an uplink signal, it is possible to provide three-dimensional beamforming to terminals even without receiving the vertical channel information directly from the terminals, and thus the signal quality of each user can be improved and the efficiency of spatial multiplexing in a cell can be increased to thereby increase the total network capacity.

14 Claims, 7 Drawing Sheets

(51) Int. Cl.
*H04L 5/00* (2006.01)
*H04B 7/0417* (2017.01)
*H04B 7/0456* (2017.01)
(52) U.S. Cl.
CPC ......... *H04B 7/0626* (2013.01); *H04B 7/0697* (2013.01); *H04L 5/0048* (2013.01); *H04L 5/0051* (2013.01); *H04L 25/0226* (2013.01); *H04L 5/0023* (2013.01)
(58) Field of Classification Search
CPC .. H04B 7/0697; H04B 7/0619; H04B 7/0695; H04B 7/0634; H04B 7/0691; H04B 7/0626; H04B 7/0632; H04B 7/088; H04B 17/309; H04L 25/0226; H04L 2025/03426; H04L 5/0048; H04W 16/28; H04W 24/10; H01Q 21/24; H01Q 21/29; H01Q 3/40

See application file for complete search history.

(56) References Cited

U.S. PATENT DOCUMENTS

| | | | | |
|---|---|---|---|---|
| 2013/0235807 A1* | 9/2013 | Lee | ........................ | H04W 72/12 |
| | | | | 370/329 |
| 2013/0308715 A1* | 11/2013 | Nam | .................... | H04B 7/0626 |
| | | | | 375/267 |
| 2015/0016379 A1* | 1/2015 | Nam | .................... | H04B 7/0639 |
| | | | | 370/329 |
| 2015/0080046 A1 | 3/2015 | Liu et al. | | |
| 2015/0105025 A1 | 4/2015 | Zhang et al. | | |
| 2015/0124688 A1 | 5/2015 | Xu et al. | | |
| 2015/0139121 A1 | 5/2015 | Shirani-Mehr et al. | | |
| 2015/0382205 A1 | 12/2015 | Lee et al. | | |
| 2016/0065291 A1* | 3/2016 | Jitsukawa | ............. | H04W 24/10 |
| | | | | 370/329 |
| 2016/0315745 A1 | 10/2016 | Kim et al. | | |

OTHER PUBLICATIONS

International Search Report (PCT/ISA/210), dated Jul. 24, 2017 by International Searching Authority in corresponding International Application No. PCT/KR2017/004433.
Communication dated Feb. 3, 2021 by the Korean Intellectual Property Office in corresponding Korean Application No. 10-2016-0050707.

* cited by examiner

METHOD AND APPARATUS FOR BEAMFORMING IN MOBILE COMMUNICATION SYSTEM

TECHNICAL FIELD

Various embodiments of the present disclosure relate to a method and a device for beamforming, and particularly, to a method and a device for transmitting a downlink signal by using a two-dimensional active array antenna in a wireless communication system.

BACKGROUND ART

In the 3rd Generation Partnership Project (3GPP) standard, the full-dimension multi input multi output (FD-MIMO) technology has been employed in the Release 13 specification to improve downlink signal quality and increase capacity by using a two-dimensional active array antenna. The FD-MIMO is a technology that improves signal quality of each user through three-dimensional beamforming, and increases efficiency of spatial multiplexing by enabling simultaneous signal transmission to a plurality of users who are spatially separated from each other, to thereby increase the total network capacity.

In order to apply the FD-MIMO technology, the two-dimensional active array antenna is to be used in a base station. Accordingly, the base station needs to acquire channel status information between each terminal and the base station in both vertical and horizontal directions, that is, three-dimensional channel information.

DISCLOSURE OF INVENTION

Technical Problem

An object of the present disclosure is directed to provision of a method for estimating, by a base station, vertical channel information by using an uplink signal, and a method and a device for forming a three-dimensional beam by using the same. Objects of the present disclosure are not limited to the above-mentioned object. That is, other objects that are not mentioned may be obviously understood by those skilled in the art to which the present disclosure pertains from the following description.

Solution to Problem

One embodiment of the present disclosure is directed to the provision of a beamforming method by a base station in a mobile communication system, the method including receiving a uplink signal from at least one terminal determining directivity information of a vertical channel of a downlink to the at least one terminal based on the uplink signal and performing resource scheduling and beamforming for the at least one terminal based on the directivity information of the vertical channel of the downlink and channel status information in a horizontal direction received from the at least one terminal.

Another embodiment of the present disclosure is directed to the provision of a base station that performs beamforming in a mobile communication system, the base station including a transceiver configured to transmit and receive signals, and a controller configured to receive an uplink signal from at least one terminal, determine directivity information of a vertical channel of a downlink to the at least one terminal based on the uplink signal and perform resource scheduling and beamforming for the at least one terminal based on the directivity information of the vertical channel of the downlink and channel status information in a horizontal direction received from the at least one terminal.

Advantageous Effects of Invention

According to the embodiments of the present disclosure, since the base station can estimate the vertical channel information by using the uplink signal, third-dimensional beamforming is provided to the terminals without directly receiving vertical channel information from the terminals, which makes it possible to improve the signal quality of each user and increase the efficiency of spatial multiplexing in a cell to thereby increase the total network capacity.

MODE FOR THE INVENTION

Figure 1:
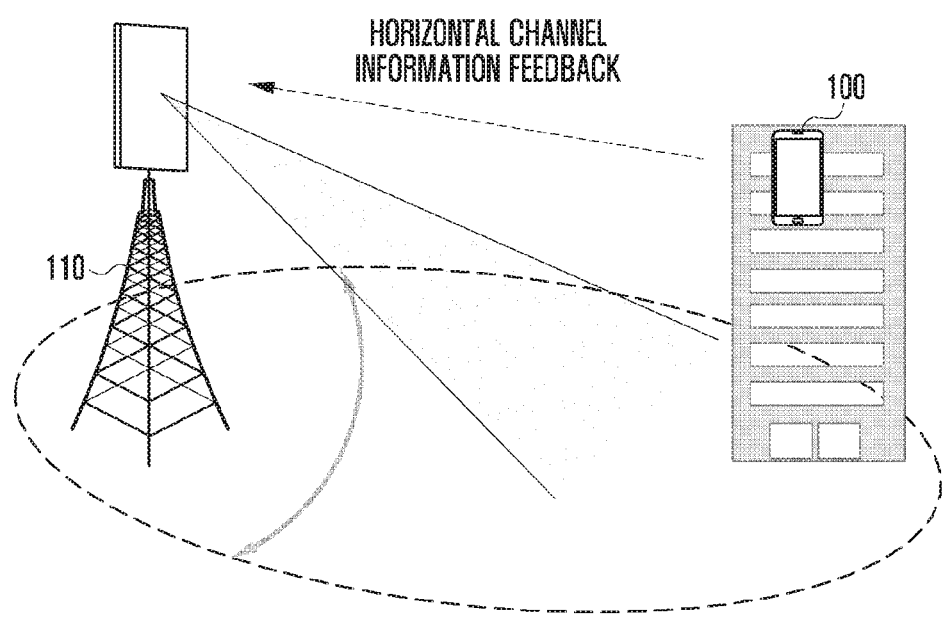
FIG. 1 is a diagram illustrating that a base station receives horizontal channel information from terminals for two-dimensional beamforming of the base station.

Hereinafter, embodiments of the present invention will be described in detail with reference to the accompanying drawings. At this time, it is to be noted that like reference numerals denote like elements in the accompanying drawings. Further, detailed descriptions related to well-known functions or configurations will be ruled out in order not to unnecessarily obscure the subject matter of the present disclosure.

In describing the exemplary embodiments of the present invention in the present specification, a description of technical contents which are well known to the art to which the present invention belongs and are not directly connected with the present invention will be described. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Advantages and features of the present invention and methods to achieve them will be elucidated from exemplary embodiments described below in detail with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '-unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

FIG. 1 is a diagram illustrating that a base station receives horizontal channel information from terminals for two-dimensional beamforming.

The base station 100 may transmit a channel status information reference signal (CSI-RS) to a terminal 100 so as to acquire channel information for forming two-dimensional beams for the terminal 100. Standard defines the channel status information reference signal (CSI-RS) transmitted by the base station. The terminal may measure a horizontal channel of a downlink signal based on the received CSI-RS, and transmit the channel status information (CSI) as a result of the measuring.

Figure 2:
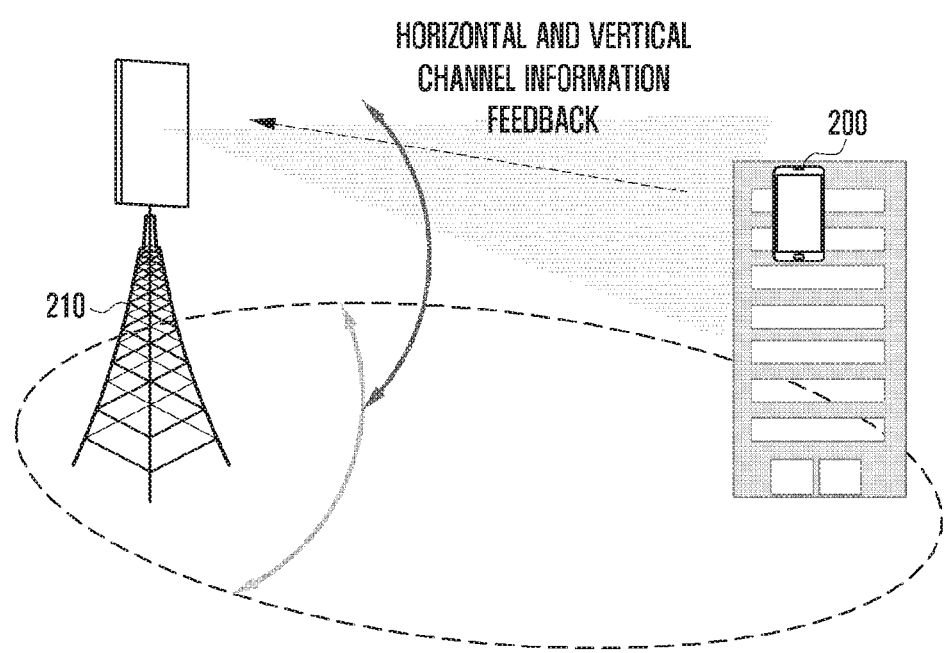
FIG. 2 is a diagram illustrating that a base station receives horizontal and vertical channel information from terminals for three-dimensional beamforming of the base station.

FIG. 2 is a diagram illustrating that a base station receives horizontal and vertical channel information from terminals for three-dimensional beamforming of the base station.

In a case of the time division duplex (TDD) system, since a downlink channel and an uplink channel are the same, the base station can acquire vertical and horizontal channel information using the uplink signal that is transmitted by the terminal. In addition, the base station can form a three-dimensional beam of the downlink, which is to be transmitted to the terminal using the vertical and horizontal channel information. However, in a case of the frequency division duplex (FDD) system, since the downlink channel and the uplink channel are different, in order to form a three-dimensional beam of the downlink as illustrated in FIG. 2, the base station has to utilize vertical and horizontal channel information of the downlink measured and reported by the terminal.

In order to form the three-dimensional beam in the FDD system described above, the terminal has to have a function for three-dimensional beamforming, not to mention the base station. In other words, in order to support FD-MIMO through the three-dimensional beamforming to an existing terminal that is not capable of measuring vertical channel information of the downlink (the terminal up to the Release 12 specification), there is a need for a method for acquire vertical channel information as well as horizontal channel information on which the base station can directly receive feedback.

Furthermore, even in the TDD system, when a terminal having multiple receive antennas does not support transmit antenna selection (TAS), the base station knows only channel information on one antenna in the terminal, and thus cannot perform rank 2MIMO transmission. Therefore, if the peak transmission rate of the terminal is important, rank 2 MIMO transmission can be performed by using feedback information of the terminal to form a downlink beam, as in the FDD system. In this case, in the TDD system, there is a need for a method for the base station to acquire channel information of another antenna when FD-MIMO is introduced.

Figure 3:
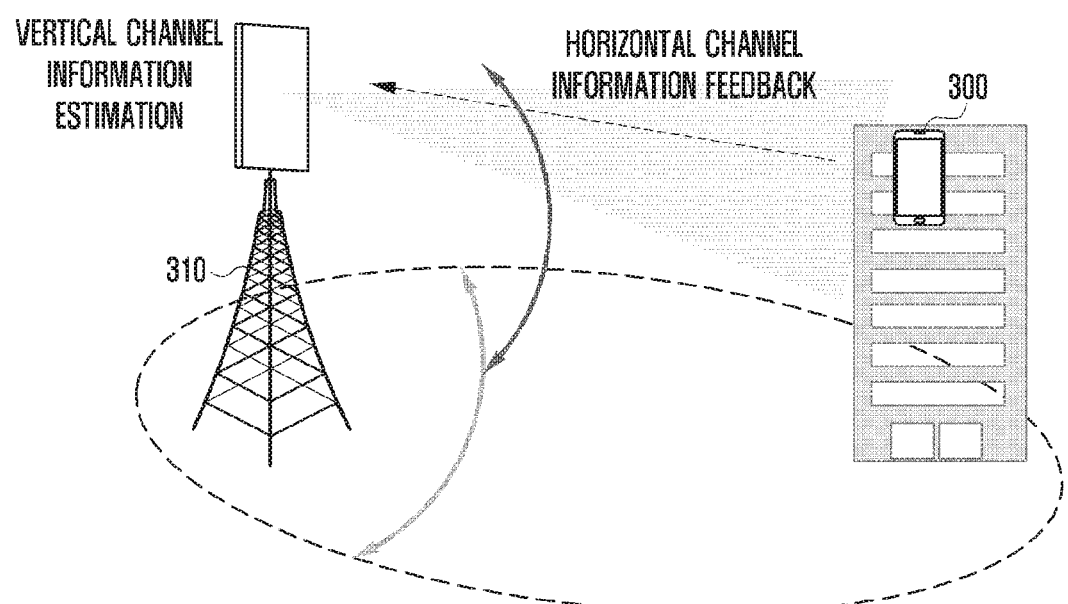
FIG. 3 is a diagram illustrating estimating vertical channel information and receiving horizontal channel information for three-dimensional beamforming method by a base station according to an embodiment of the present invention.

FIG. 3 is a diagram illustrating estimating vertical channel information and receiving horizontal channel information for three-dimensional beamforming method by a base station according to an embodiment of the present invention.

In the FDD system, the uplink channel is instantaneously different from the downlink channel, but statistic characteristics of the channels are similar to each other. Therefore, uplink channel information can be used to estimate channel information of the downlink.

Using the characteristics described above, the base station 310 estimates vertical channel information using the uplink signal, and utilizes horizontal channel information that the terminal 300 has measured and fed back, to thereby perform the third-dimensional beamforming, as illustrated in FIG. 3.

Figure 4:
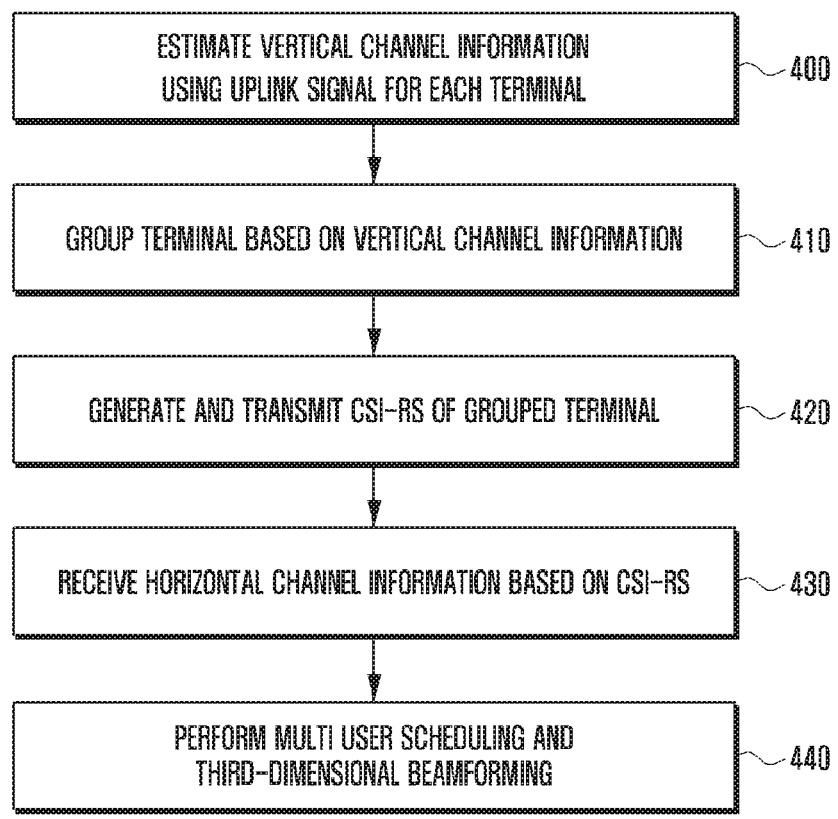
FIG. 4 is a flowchart describing a three-dimensional beamforming process by the base station according to the embodiment of the present invention.

FIG. 4 is a flowchart describing a three-dimensional beamforming process by the base station according to the embodiment of the present invention.

The base station may estimate vertical channel information using the uplink signal received from each of the serving terminals (400). The uplink signal may include a sounding reference signal (SRS). Furthermore, vertical channel information may include directivity information of the vertical channel of the downlink, which is estimated based on correlation information between a plurality of vertical channels of the uplink.

The base station may estimate vertical channel information of the downlink using a correlation matrix of the uplink channel. First, when the number of vertical antenna signals is two, the correlation matrix of the uplink channel can be obtained by the following Equation 1.

$$R_V = \frac{1}{N_{TTI}} \frac{1}{N_{sc}} \frac{1}{N_{Col}} \sum_t^{N_{TTI}} \sum_f^{N_{sc}} \sum_n^{N_{Col}} [\, h_n(t,f) \quad h_{n+N_{Col}}(t,f) \,]^H$$

$$[\, h_n(t,f) \quad h_{n+N_{Col}}(t,f) \,]$$

Equation 1

Figure 5:
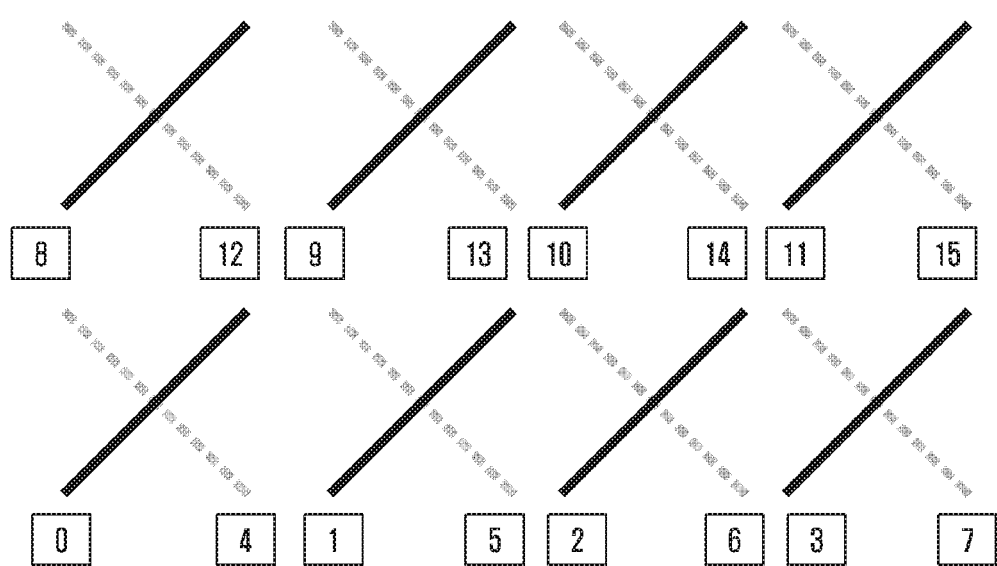
FIG. 5 is a diagram illustrating an antenna port number of a two-dimensional array antenna.

$h_n(t,f)$ is a coefficient of an uplink channel corresponding to an n-th antenna port in the t-th sub-frame and the f-th subcarrier, and the antenna port number is given in FIG. 5. $N_{sc}$ denotes the number of subcarriers, $N_{col}$ denotes the number of antenna ports in the vertical direction, and $N_{TTI}$ denotes the number of sub-frames taking an average, where the correlation matrix of the vertical channel is derived by taking an average over sub-frames long enough for the downlink and other instantaneous channel characteristics to disappear.

For example, when four vertical antenna signals are present, the correlation matrix of the uplink channel may be derived as indicated in Equation 2 below.

$$R_V = \frac{1}{N_{TTI}} \frac{1}{N_{sc}} \frac{1}{N_{Col}} \sum_t^{N_{TTI}} \sum_f^{N_{sc}} \sum_n^{N_{Col}} \begin{bmatrix} h_n(t,f)^* \\ h_{n+N_{Col}}(t,f)^* \\ h_{n+2N_{Col}}(t,f)^* \\ h_{n+3N_{Col}}(t,f)^* \end{bmatrix}$$

$$[\, h_n(t,f) \quad h_{n+N_{Col}}(t,f) \quad h_{n+2N_{Col}}(t,f) \quad h_{n+3N_{Col}}(t,f) \,]$$

Equation 2

Then, the base station may derive directivity information of the vertical channel based on the correlation matrix. The base station may determine a vertical weight vector that maximizes the gain of vertical beamforming to derive directivity information of the vertical channel, and the eigenvector (maximum eigenvector) corresponding to the maximum eigenvalue of the correlation matrix Rv becomes the vertical weight vector. Meanwhile, since the uplink and the downlink instantaneous channels are the same in the TDD terminal where the TAS is not supported, a process of taking the average over the sub-frames is excluded in Equation 1.

Then, the base station may group terminals that have the similar vertical channel information (410). In one embodiment, the base station may obtain the correlation between vertical weight vectors of respective terminals to group terminals corresponding to vertical weight vectors having the correlation value equal to or greater than a predetermined threshold.

In another embodiment, the base station may group terminals using a predefined codebook, that is, based on the vector in the codebook.

Specifically, a weight vector index Pv may be derived from Equation 3 using the correlation matrix Rx of the uplink channel for each terminal, and the terminals may be grouped based on the weight vector index.

$$p_v = \arg\max_{p_v}\{w_{p_v}^H R_v w_{p_v}\}$$

Equation 3

$w_{p_v}$ denotes the Pv-th vector of the applied codebook, for example, the 2Tx codebook when there are two vertical antenna signals, the 4Tx codebook when there are four vertical antenna signals, and so on.

In yet another embodiment, the base station may group terminals based on vectors in the codebook that the base station has created using the vertical weight vector for each terminal, instead of the predefined codebook. It will be described in FIG. 6 below.

Figure 6:
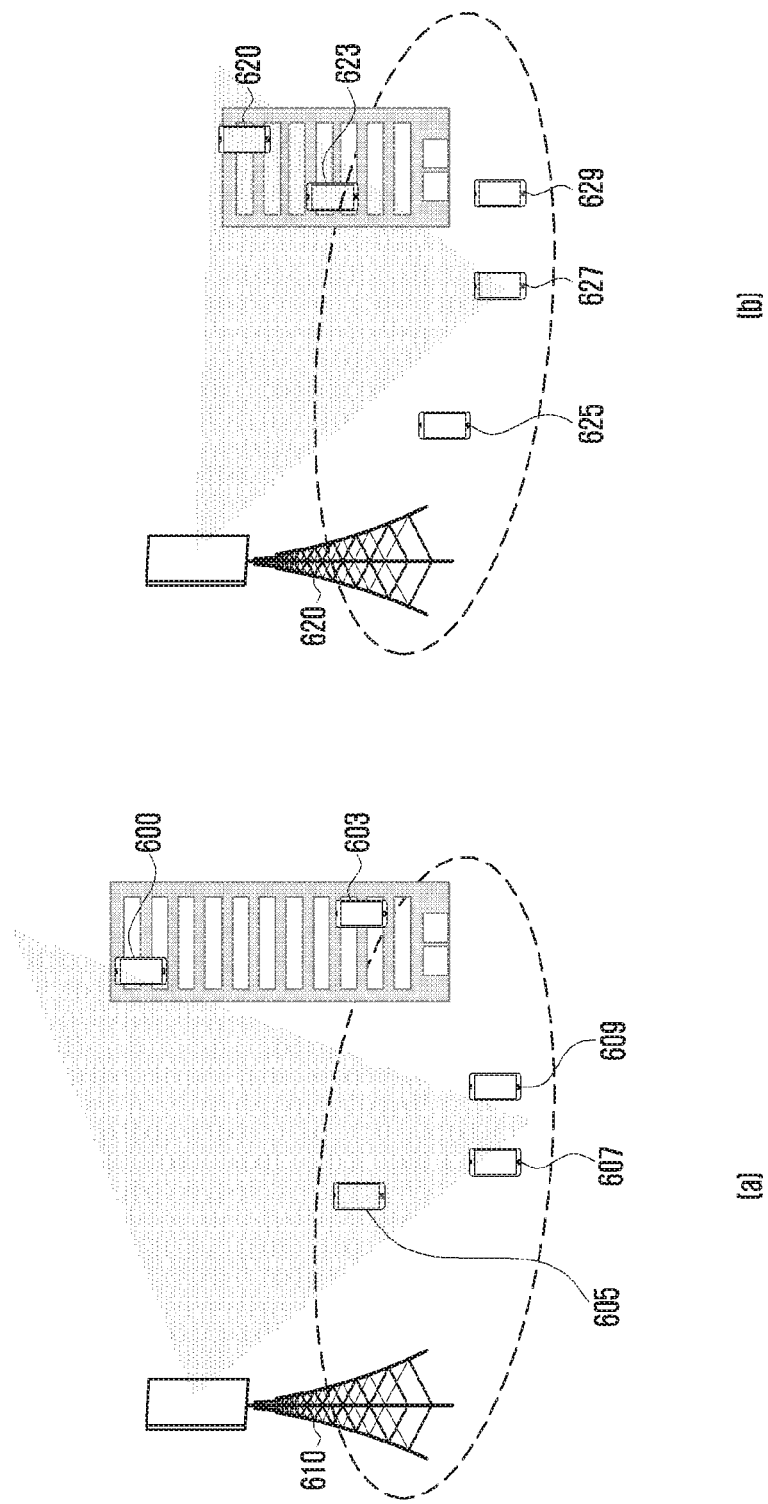
FIG. 6 is a diagram illustrating the degree of vertical distribution of terminals in a cell.

FIG. 6 is a diagram illustrating the degree of vertical distribution of terminals in a cell.

Degrees of vertical distribution of terminals may differ depending on the installation environment of antennas of base stations 610, 620 or the distribution environment of terminals 600-629, as illustrated in FIG. 6(a) and FIG. 6(b). In this case, according to one embodiment of the present invention, the base stations 610, 620 may design vertical codebooks according to corresponding terminal distribution information, and group the terminals using the vectors in the codebooks. In addition, the base stations 610, 620 may periodically reflect changes in the degrees of distribution of terminals to update the codebooks.

A common downlink vertical weight vector is applied to terminals in the same group, which are grouped in the method described above, are applied, where the used codebook is a set of downlink vertical weight vectors per group. Meanwhile, when the base station groups terminals, a plurality of groups may exist in one cell of the base station, and a terminal capable of setting a plurality of CSI processes, for example, a terminal that supports multiple CSI processes of the Release 11 may belong to several groups.

Then, the base station may configure CSI-RS configuration information for each terminal that has been grouped to transmit the information to terminals that have been grouped (420). In this case, for the terminals in one group, common CSI-RS configuration information is configured and transmitted to the terminals. The base station may receive horizontal channel information based on the transmitted CSI-RS (430). Then, the base station may perform scheduling and the third-dimensional beamforming for multiple users base on the characteristics of the vertical channel that has been previously estimated and the horizontal channel information (440). The base station may perform downlink transmission by multiplexing different times or frequencies for the terminals. That is, the base station may perform scheduling separately for the transmission time interval (TTI) and for the resource block (RB), and may perform multi-user MIMO scheduling using three-dimensional channel information that has been re-configured at the time of scheduling. The base station forms the three-dimensional beam for the terminal selected according to the scheduling result. In this case, the base station may form the beam so as to minimize interference between selected terminals.

Figure 7:
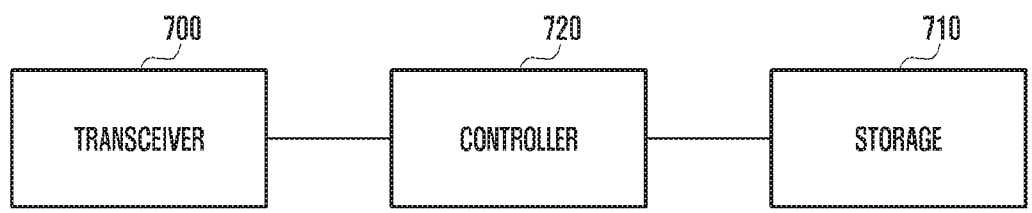
FIG. 7 is a diagram illustrating an internal structure of the base station according to the embodiment of the present invention.

FIG. 7 is a diagram illustrating an internal structure of the base station according to the embodiment of the present invention.

More specifically, the base station may include a transceiver 700, a storage 710, and a controller 720.

The transceiver 700 may transmit and receive signals required for the base station to perform operations according to the present invention. More specifically, the transceiver 700 may receive an uplink signal from a serving terminal. In addition, the transceiver 700 may transmit the received uplink signal to the controller 720 to allow vertical channel information of the uplink signal to be estimated. Furthermore, the transceiver 700 may receive channel status information reference signal (CSI-RS) for the grouped terminal from the controller 720 to transmit the grouped terminal. Furthermore, the transceiver 700 may receive horizontal channel information of the terminals measured based on the CSI-RS.

The storage 710 may store information for the base station to perform operations according to the present invention. The storage 710 may store information received from the transceiver 700. In addition, the storage 710 may transmit the stored information to the controller 720. The controller 720 may receive uplink signals from at least one terminal, determine directivity information of the vertical channel of the downlink for the at least one terminal based on the uplink signal, and perform a control of resource scheduling and beamforming for the at least one terminal based on directivity information of the vertical channel of the downlink and channel status information in the horizontal direction received from the at least one terminal. The directivity information of the vertical channel of the downlink may be determined based on correlation information of a link vertical channel derived based on the uplink signal. Furthermore, the channel status information in the horizontal direction may be generated based on the directivity information of the vertical channel of the downlink.

In addition, the controller 720 may derive directivity information of the uplink vertical channel for each of the at least one terminals based on correlation information of the vertical channel of the uplink, group the at least one terminal based on the directivity information of the vertical channel of the uplink, and perform a control of determining directivity information of the vertical channel of the downlink for each group into which the terminals are grouped.

In addition, the controller 720 may derive directivity information of the vertical channel for each terminal based on correlation information of the uplink vertical channel, group the at least one terminal based on directivity information of the vertical channel of the uplink, and perform a control of determining directivity information of the link vertical channel for each group into which the terminals are grouped. Furthermore, the directivity information of the vertical channel of the downlink may be determined based on correlation information of the link vertical channel derived based on the uplink signal. In addition, the controller 720 may generate configuration information of the channel status information for each grouped terminal, and perform a control of transmitting the configuration information of the channel status information generated for each grouped terminal to at least one corresponding terminal of grouped terminals. The uplink signal may include a sounding reference signal (SRS).

The controller 720 may perform a control of grouping at least one terminal based on directivity information of a vertical signal channel of the uplink based on the vector in the codebook, and codebook information may be periodically updated by the base station. Furthermore, the mobile communication system according to the present invention may include at least one of the time division duplex (TDD) system and the frequency division duplex (FDD) system.

In embodiments described above, every step and every message may be subject to selective execution or omission. In each embodiment, steps are not necessarily performed in order, and may be reversed. The same is true for message transmission. Each step and each message may be performed independently.

Some or all of tables shown by way of example in the embodiments described above illustrate embodiments of the present invention to facilitate understanding. Therefore, details of the tables are considered to represent a part of the method and the device disclosed in the present invention. That is, it may be desirable that the contents of the tables in the specification be accessed semantically rather than syntactically.

The embodiments of the present invention disclosed in the present specification and the accompanying drawings have been provided only as specific examples in order to assist in understanding the present invention and do not limit the scope of the present invention. That is, it is obvious to those skilled in the art to which the present invention pertains that other change examples based on the technical idea of the present invention may be made without departing from the scope of the present invention.

The invention claimed is:

1. A beamforming method by a base station in a mobile communication system, the method comprising:
   receiving an uplink signal from at least one terminal;
   estimating downlink vertical channel information based on the received uplink signal;
   transmitting a channel status information reference signal (CSI-RS) to the at least one terminal based on the estimated downlink vertical channel information;
   receiving, from the at least one terminal, a channel status information (CSI) report corresponding to a downlink horizontal channel based on the transmitted CSI-RS;
   determining downlink horizontal channel information based on the received CSI report corresponding to the downlink horizontal channel; and
   performing resource scheduling and beamforming for the at least one terminal based on the estimated downlink vertical channel information and the determined downlink horizontal channel information,
   wherein the downlink vertical channel information includes directivity information of a vertical channel of a downlink, determined based on a vertical weight vector obtained using correlation information corresponding to a plurality of uplink vertical channels.

2. The method of claim 1, further comprising:
   deriving directivity information of a vertical channel of an uplink for each of the at least one terminal based on correlation information of the vertical channel of the uplink;
   grouping the at least one terminal based on the directivity information of the vertical channel of the uplink; and
   determining the directivity information of the vertical channel of a downlink for each group into which the at least one terminal is grouped.

3. The method of claim 2, further comprising:
   generating configuration information of channel status information for each grouped terminal; and
   transmitting the configuration information of the channel status information generated for each grouped terminal to at least one corresponding terminal of grouped terminals.

4. The method of claim 1, wherein the uplink signal includes a sounding reference signal (SRS).

5. The method of claim 2, wherein the grouping the at least one terminal includes grouping the at least one terminal based on the directivity information of the vertical channel of the uplink based on a vector in a codebook.

6. The method of claim 5, wherein the codebook is periodically updated by the base station.

7. The method of claim 1, wherein the mobile communication system includes at least one of a time division duplex (TDD) system and a frequency division duplex (FDD) system.

8. A base station that performs beamforming in a mobile communication system, the base station comprising:
    a transceiver; and
    a controller configured to control the transceiver to receive an uplink signal from at least one terminal, estimate downlink vertical channel information based on the received uplink signal, transmit a channel status information reference signal (CSI-RS) to the at least one terminal based on the estimated downlink vertical channel information, control the transceiver to receive from the at least one terminal, a channel status information (CSI) report corresponding to a downlink horizontal channel based on the transmitted CSI-RS, determine downlink horizontal channel information based on the received CSI report corresponding to the downlink horizontal channel and perform resource scheduling and beamforming for the at least one terminal based on the estimated downlink vertical channel information and the determined downlink horizontal channel information,
    wherein the downlink vertical channel information includes directivity information of a vertical channel of a downlink, determined based on a vertical weight vector obtained using correlation information corresponding to a plurality of uplink vertical channels.

9. The base station of claim 8, wherein the controller is configured to derive directivity information of a vertical channel of an uplink for each of the at least one terminal based on correlation information of the vertical channel of the uplink, group the at least one terminal based on the directivity information of the vertical channel of the uplink; and determine the directivity information of the vertical channel of a downlink for each group into which the at least one terminal is grouped.

10. The base station of claim 9, wherein the controller is configured to generate configuration information of channel status information for each grouped terminal and control the transceiver to transmit the configuration information of the channel status information generated for each grouped terminal to at least one corresponding terminal of grouped terminals.

11. The base station of claim 8, wherein the uplink signal includes a sounding reference signal (SRS).

12. The base station of claim 9, wherein the controller is configured to group the at least one terminal based on the directivity information of the vertical channel of the uplink based on a vector in a codebook, and
    the codebook is periodically updated by the base station.

13. The base station of claim 8, wherein the mobile communication system includes at least one of a time division duplex (TDD) system and a frequency division duplex (FDD) system.

14. The method of claim 1, wherein the estimating the downlink vertical channel information comprises:
    determining, as the vertical weight vector, a vector that maximizes a gain of vertical beamforming using the correlation information; and
    estimating the directivity information based on the determined vertical weight vector.

* * * * *